United States Patent [19]

Mraz

[11] 4,111,492
[45] Sep. 5, 1978

[54] PNEUMATIC CONVEYING APPARATUS AND METHOD

[76] Inventor: Joseph Mraz, 501 E. Lee St., Plant City, Fla. 33566

[21] Appl. No.: 762,304

[22] Filed: Jan. 25, 1977

Related U.S. Application Data

[63] Continuation-in-part of Ser. No. 654, 796, Feb. 3, 1976, Pat. No. 4,009, 912, which is a continuation-in-part of Ser. No. 520, 943, Nov. 4, 1974, abandoned.

[51] Int. Cl.$^2$ ............................................. B65G 53/36
[52] U.S. Cl. .................................. 302/39; 222/144.5; 302/27
[58] Field of Search ......................... 302/39, 27, 23, 25, 302/40, 42, 50–55, 57, 58, 35; 222/144.5, 145

[56] References Cited

U.S. PATENT DOCUMENTS

| 267,318 | 11/1882 | Beach | 302/39 |
|---|---|---|---|
| 1,053,014 | 2/1913 | Cron | 302/39 |
| 2,971,679 | 2/1961 | Pavia | 222/144.5 |
| 3,424,501 | 1/1969 | Young | 302/23 |

FOREIGN PATENT DOCUMENTS

| 2,149,262 | 4/1973 | Fed. Rep. of Germany | 302/39 |
|---|---|---|---|
| 2,252,870 | 5/1973 | Fed. Rep. of Germany | 302/40 |

Primary Examiner—Bruce H. Stoner, Jr.
Assistant Examiner—Jeffrey V. Nase
Attorney, Agent, or Firm—Burns, Doane, Swecker & Mathis

[57] ABSTRACT

A pneumatic conveying system for a granular, powdery, or liquid product which utilizes during normal operation pressure differentials to convey and to regulate the flow of product through the system. A high velocity stream of air creates a pressure differential between a main pipeline and a product chute elbow to thereby suck the product into the stream of air. The system includes a pair of tank chambers so that the product may be fed alternatively from the two tank chambers into the product chute elbow. The tank chambers may be of sufficiently small size so that switching from tank to tank occurs less than two minutes apart preferably in the range of from about one minute to one second. Each tank chamber includes outlet and inlet openings which are pressure operated. The switching is controlled by introduction of air into one tank at a time which simultaneously closes the product inlet opening into the tank and opens the outlet opening. The product outlet openings may both be closed simultaneously by abnormal pressure differentials created by a blockage of the flow of product in the pipeline. The closure of both product outlet valves prevents further feed of product to the main pipeline and also prevents a blowback of product into the system. A suction pump can be connected to each tank chamber to draw product into one tank to fill such tank while the other tank is being emptied.

14 Claims, 11 Drawing Figures

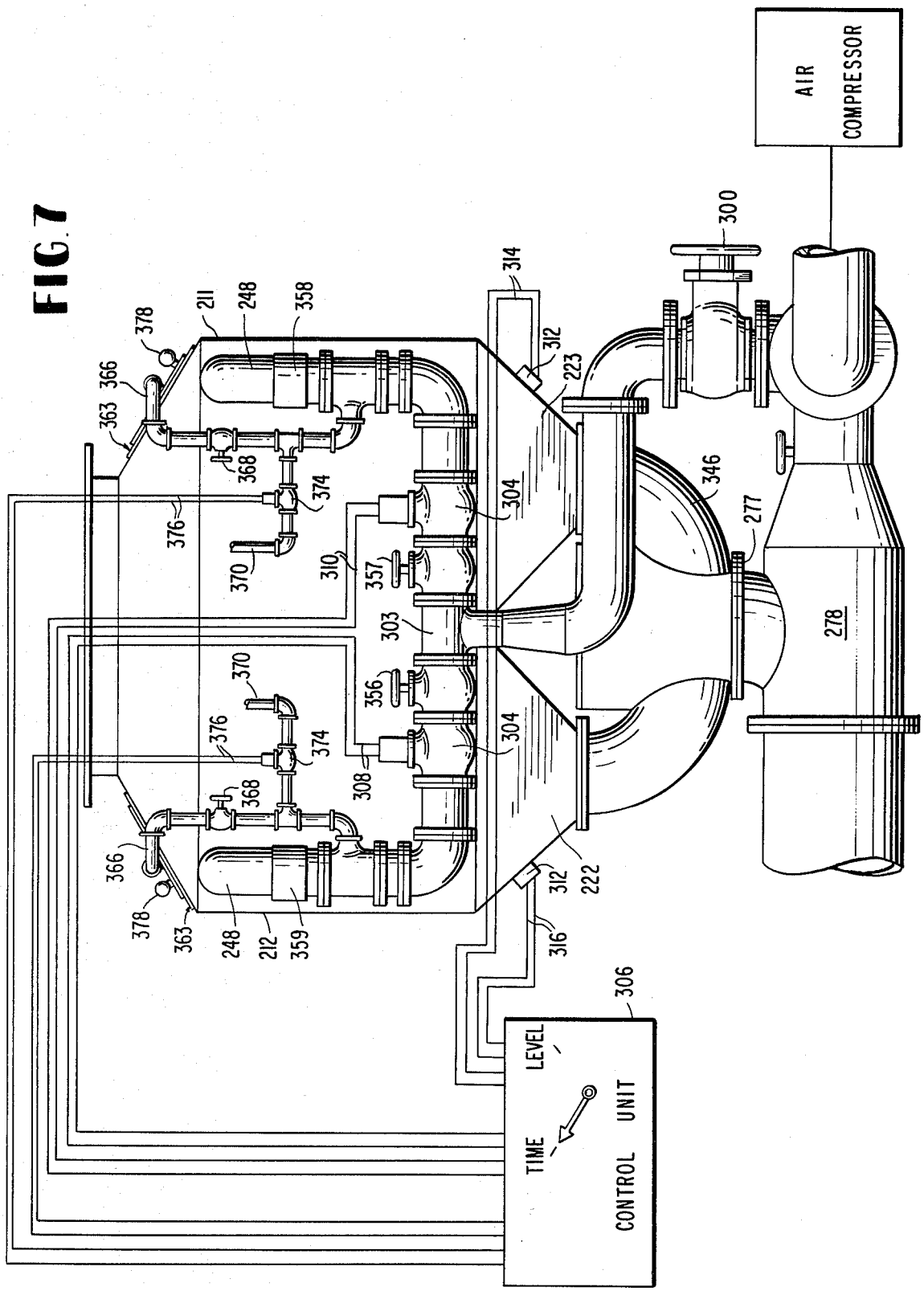

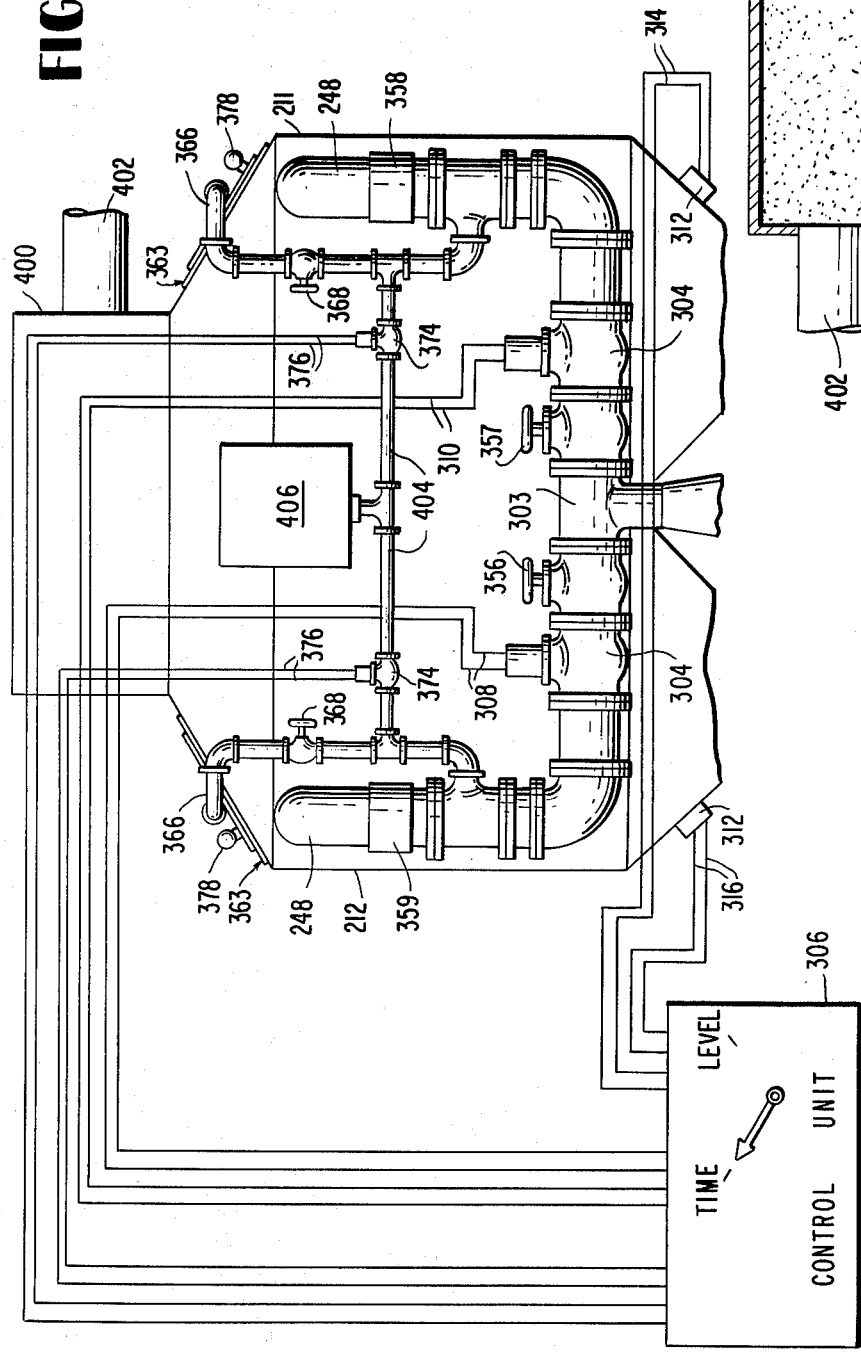

PNEUMATIC CONVEYING APPARATUS AND METHOD

RELATED APPLICATIONS

This application is a continuation-in-part of my copending U.S. application Ser. No. 654,796 filed Feb. 3, 1976 for "Pneumatic Conveying Apparatus and Method", now U.S. Pat. No. 4,009,912 issued Mar. 1, 1977 which, in turn, is a continuation-in-part of my earlier filed U.S. application Ser. Nos. 520,943 filed Nov. 4, 1974, Ser. No. 327,640 filed Jan. 29, 1973, and Ser. No. 193,630 filed Oct. 29, 1971, the latter three applications being abandoned.

The present invention relates to a pneumatic conveying apparatus and method for transporting pulvervient, powdery, granular or liquid material, hereinafter referred to as product, along a pipeline, and more particularly to apparatus for feeding a product into a pipeline.

It is often necessary to transport a product over relatively long distances and to heights of fifty yards or so in the storing and handling of such materials. Manufacture of the product may take place on a twenty-four hour schedule and require that the product be continually moved from production areas to storage areas and subsequently to loading zones for ultimate delivery. The product is frequently stored in large tanks or hoppers at locations separated from one another by distances on the order of a hundred yards or more. It is common practice to discharge the product from the lower portions of these tanks to be transported to other tanks which are filled from above.

Pneumatic conveying systems utilizing screw feed conveyor sections have found widespread use in such product handling operations. U.S. Pat. Nos. 1,533,539, 1,941,572, 1,941,573, and 2,299,470 are examples of prior art screw conveyors currently in use in conjunction with feeding a product into a pipeline.

It has been recognized that one of the most troublesome problems encountered while transporting a product pneumatically is the prevention of blowback which occurs when there is a blockage in the main pipeline. The prior systems solved this problem by forming a sealing plug of product in the screw conveyor section thereby preventing the unwanted back flow of air into the hopper. In some cases, a weighted door was added to further aid in compacting the product in the screw conveyor section.

These prior systems required substantial maintenance due primarily to the employment of rotating screw feed devices. The abrasive and corrosive nature of many products, such as are used in fertilizers, adversely affected the life of these rotating parts. Additionally, large motors of from 100 to 200 horsepower were required to drive these rotating screw devices. Also, it can be appreciated that the noise associated with the operation of screw conveyors was undesirable.

The problems caused by the blowback of the product and alternate proposals for dealing with this problem are discussed also in United States patents such as U.S. Pat. Nos. 3,460,869 and 1,675,090. In one such device, an air lock or chamber is provided to isolate the hopper from occasional blowbacks which disrupt product feed. Another device, disclosed in U.S. Pat. No. 1,675,090, utilized a baffle plate to assist in compacting material being delivered from a hopper. It is evident that stopping material flow, should a blockage or overloading occur within the main pipeline, may only be accomplished by the stopping of the rotation of the screw. Where the product to be conveyed has the property of hardening when allowed to set in a compacted condition, removal of the screw is frequently necessary before the system can again be started up.

Additionally, it has been found desirable when transporting highly abrasive or reactive products to cause the product to float in or on a stream of air having very little turbulence associated with it. The low turbulence reduces contact between the product being conveyed and the pipeline walls, and further provides for the complete utilization of any high velocity airstream employed or conveying purposes. Where turbulence is encountered or the product is conveyed through a nozzle, for example, as in British Pat.No. 1,020,543, the system does not have the desired flow characteristics, and feeds the product while it is in contact with the surfaces of a conveying secton, thereby causing the product to be positioned below the conveying nozzle.

A major object of the present invention is to provide a novel pneumatic conveying method and apparatus including dual tanks for supplying product to a pipeline which utilizes a minimum number of moving parts and does not require a screw, rotary gate valve or similar device, thereby substantially reducing maintenance problems and providing for a quieter conveying operation.

A further object of the pneumatic conveying system is to provide a novel method of controlling the feed of the product into the pipeline through the use of dual tanks. I have observed that when movement of the product through the pipeline is intermittent due to overloading of the pipeline which results in temporary blockages, or ceases due to loss of air pressure because of a power outage or malfunction of the compressor, the product continues to be fed into the zone, sometimes referred to as the transition chamber, where the product flow joins the main pipeline air flow. Before the system can be started up, it is customarily necessary to clean out the transition chamber manually. By use of the dual tank feature of my invention, the problems are obviated. It is accordingly another object to provide a novel system and method for supplying product into the pneumatic pipeline by alternating the product feed first from one tank and then the other tank. The size of the tanks is limited so that each tank can be emptied during a period of less than two minutes, preferably a period in the range of from about 1 minute to about 1 second.

A further object of the present invention is to provide a novel pneumatic conveying method and apparatus for feeding a product from dual tanks into a main pipeline through a pair of chutes which communicate with a transition chamber through a lower chute elbow. The transition chamber is in communication with both the main pipeline and with the chutes. A pressure differential existing between the transition chamber and the lower chute elbow during normal operation is used to suck, or force the product out of the chute elbow and into the transition chamber. The pressure in the transition chamber must be less than the pressure in the chute elbow in order to suck, or force the product out of the chute elbow.

A still further object is to provide a novel pneumatic conveying method and apparatus for feeding a product into a pipeline from dual tanks by means of a pair of chutes wherein each chute includes a check valve so that the tanks may alternately supply product to a transition chamber. The check valve of each chute opens whenever the pressure in the transition chamber is less than the pressure in the tank associated with the check valve. Whenever the pressure in the transition chamber is greater than the pressure in a tank, the check valve associated with that tank will be closed, thereby cutting off the flow of product to the pipeline. The pneumatic conveying system and its method of operaton is such that the product flow into the chutes from the tanks is instantly cut off whenever a blockage of the pipeline occurs, thus preventing a blowback through the chutes. A pressure in a tank that is greater than the pressure in the transition chamber automatically reestablishes the flow of product to the pipeline.

One embodiment of my invention is characterized by having a transition chamber disposed between the pipeline and a source of gas pessure and connected to the gas pressure source so as to provide a region of negative pressure. A product conveying chute is connected between a supply of product and the negative pressure region of the transition chamber. A valve, located in the chute means, is so arranged as to be opened by the negative pressure in the transition chamber and to be closed by gravity, or a spring force or a combination of both, and to be forced in a closed position by a positive pressure in the transition chamber which occurs when the flow of gas through the transition chamber is blocked or otherwise impeded in such fashion as to cause loss of the negative pressure.

Another object of the present invention is to provide a novel pneumatic conveying method wherein an accumulation of product in a lower chute elbow resulting from a blockage of the flow of product may be cleared away by the injection of highly pressurized gas into the lower chute elbow. A bypass line which extends from the main pipeline to the delivery chute may be provided in the system to supply the injection of highly pressurized gas.

A further object is to provide a novel pneumatic conveying method and apparatus for feeding a product from dual tanks into a pipeline through a pair of chutes having check valves, wherein a pressure increase in a main pipeline, or in a transition chamber where the product is delivered to be conveyed in the pipeline, is utilized directly for cutting off the flow of product to the pipeline through closure of the valve. The system and its method of operation is such that it causes an instant cutoff of the product flow once a blockage of the pipeline occurs, thus preventing a blowback through the chute; and when a normal negative pressure condition occurs in the chamber, the product flow is automatically reestablished. One of the features found in certain preferred embodiments resides in the provision of an auxiliary gas stream located in the exit portion of the chute downstream of the valve to "fine tune" the system and enhance movement of the product from the chute into the pipeline.

Another object of my invention is to provide a novel switching from one tank to the other. The tank structure that I preferably employ has an inlet conduit that is sloped and the discharge end arranged so that product feed into the tank can be closed by a novel check valve. This check valve has a rear surface covered by a hood that is selectively supplied with air at a comparatively low pressure less than the compressor pressure. This low pressure provides the sole force to close the check valve. The hood is slotted so that the entire tank is pressurized to thus serve as the operating force for opening the tank discharge door, which also is the check valve that prevents blowback into the tank and regulates somewhat, the rate of product feed in accordance with the negative pressure in the transition chamber. By switching the low pressure from an empty tank to the filled tank, the inlet valve to the empty tank is allowed to be opened by the weight of product on the valve while the valve in the other tank is forced to its closed position solely by the pressure of the low pressure air applied to the chamber under the hood. As the pressure in the other tank builds up, the tank discharge door opens to empty the product into the transition chamber at a rate controlled by the associated check valve at the lower end of the tank.

A further object is to provide a novel Y-shaped housing mounted at the bottom of the two tanks and provided with separate check valves in each inlet leg that are mounted at their upper edges for pivotal movement about substantially parallel horizontal axes with their lower edges moving into a common region so that when one valve is open, its lower edge swings into a position that abuts or at least interferes with the simultaneous opening of the other check valve.

It is another object of the invention to provide a novel transferring of granular product to a pair of alternately emptying tanks. A suction system is provided which alternately produces a vacuum in the tanks to draw product from the source.

These and other advantages will become more fully apparent from the claims, and from the description as it proceeds in conjunction with the appended drawings wherein:

THE DRAWINGS

FIG. 4 is a plan view of the rear of the door closing the inlet channel at the top of tank 211 as viewed along line 4—4 in FIG. 1;

FIG. 5 is an end view of the door taken along line 5—5 in FIG. 4;

FIG. 7 is a rear elevation of the apparatus of FIG. 6;

FIG. 10 is a fragmentary front elevation in partial section of another preferred embodiment of my invention; and FIG. 11 is a rear elevation of the apparatus of FIG. 10.

DETAILED DESCRIPTION OF THE PREFERRED EMBODIMENTS OF THE INVENTION

Referring now to FIGS. 1-5, an embodiment is shown which is arranged to control the rate of feed of the product for maximum efficiency in terms of tons per hour that can be conveyed by the pneumatic conveying system. There is provided a pair of tanks arranged in parallel so that while one is being emptied into the pipeline, the other is being filled. Both tanks can be simultaneously closed to prevent feed into the pipeline even when the air pressure is turned off.

Figure 1:
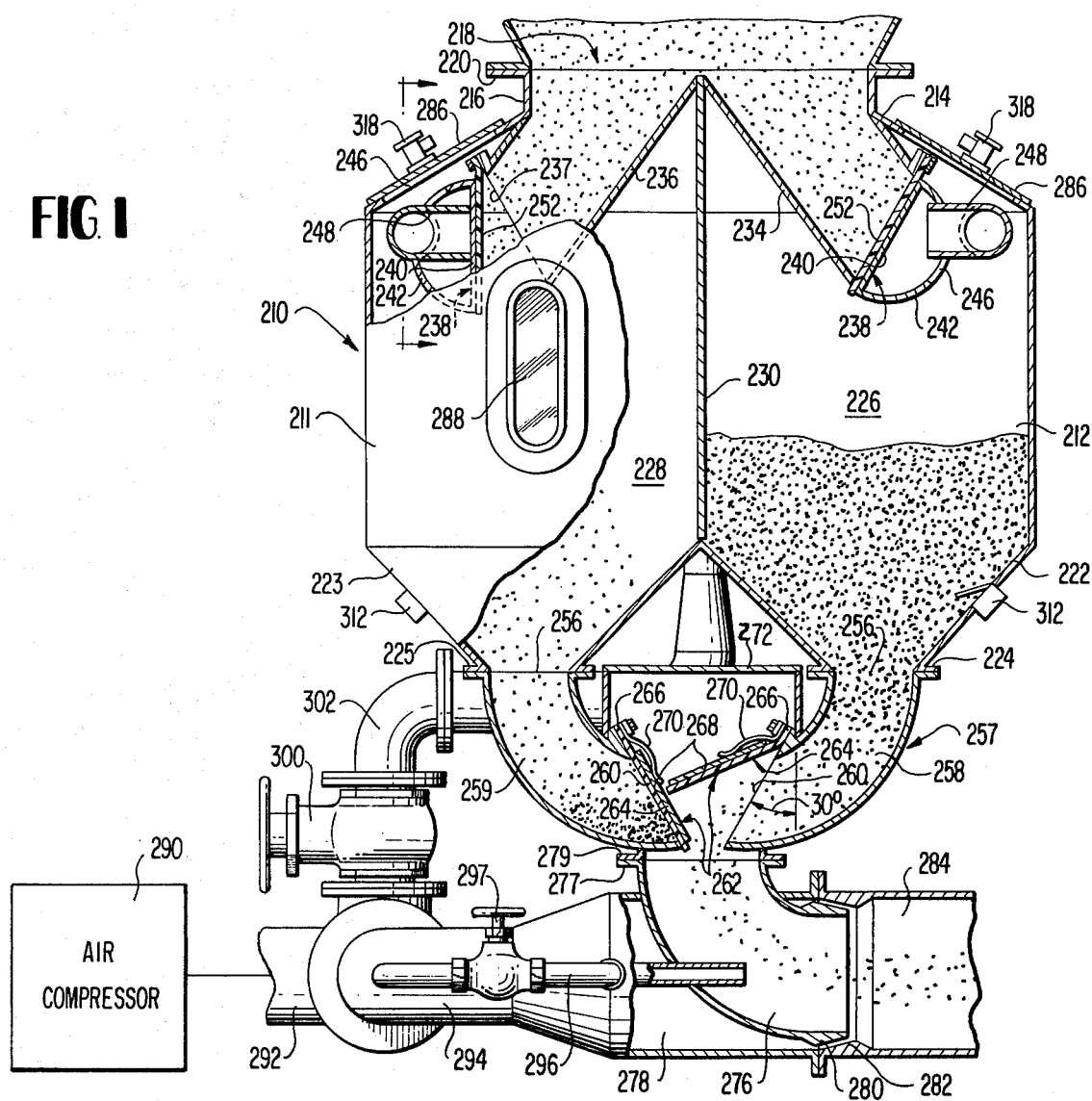
FIG. 1 is a front elevation in partial section of an embodiment of my invention having a dual tank feeding apparatus.
Figure 2:
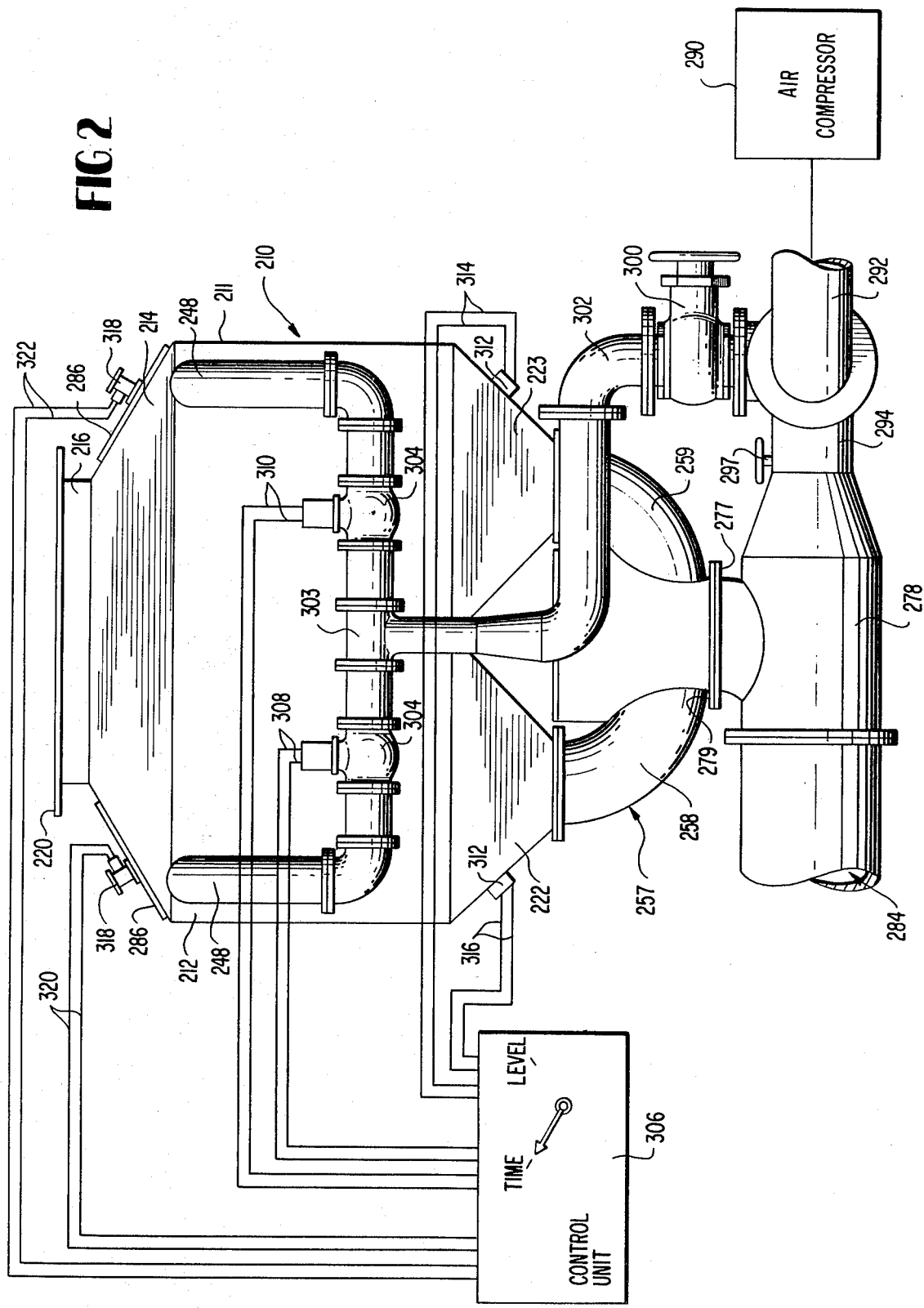
FIG. 2 is a rear elevation of the apparatus of FIG. 1.
Figure 3:
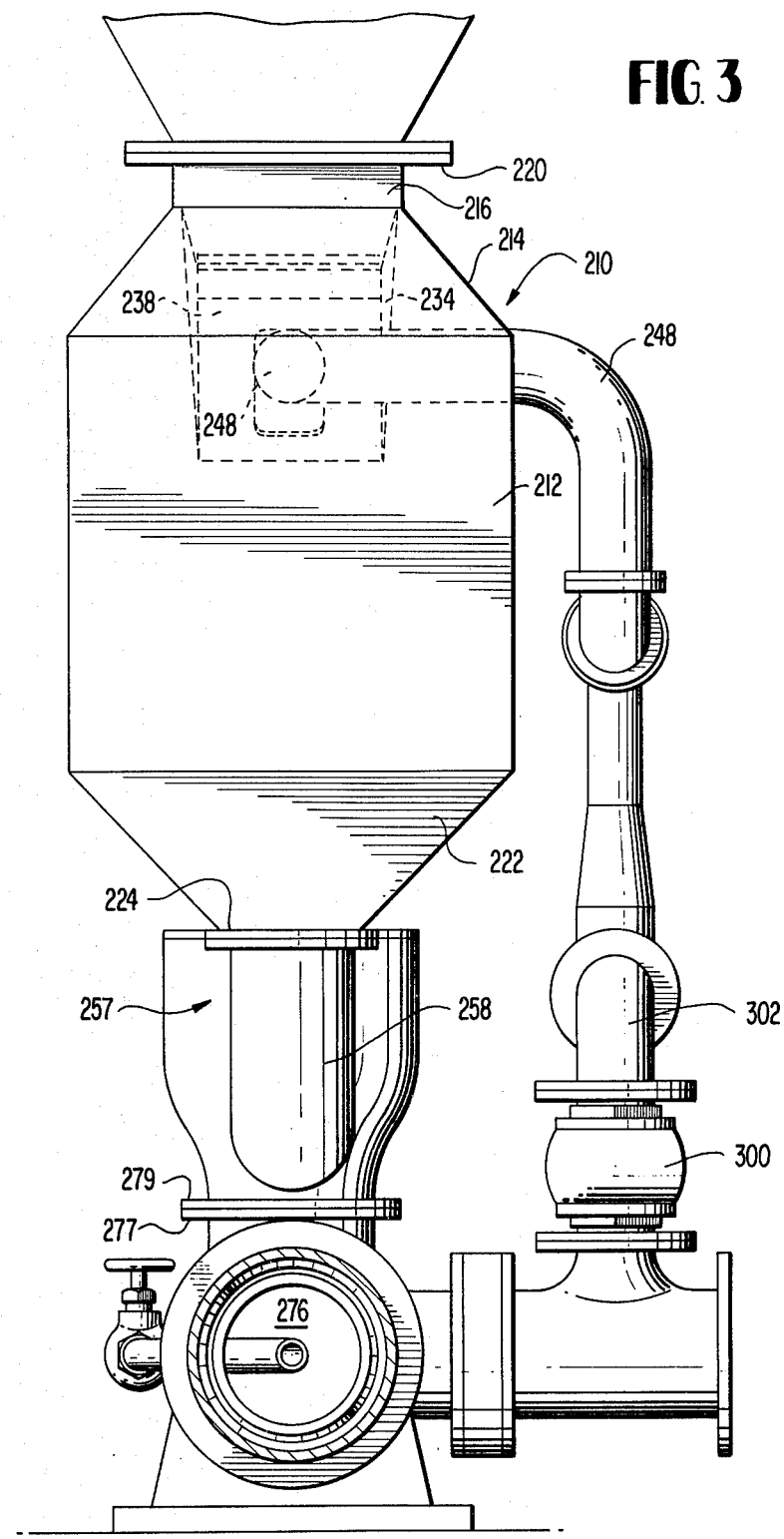
FIG. 3 is a right side elevation of the apparatus of FIG. 1.

With continued reference to FIGS. 1-3, a dual tank 210 has a central body portion which may be of substantially oval cross section having semi-cylindrical end portions 211 and 212 separated by plate 230. The upper end of the tank unit includes a truncated tapered portion 214 terminating in a cylindrical end portion 216 providing a product receiving opening 218 surrounded by a circular flange 220. The lower end of the tank is illustrated with a pair of inverted conical sections 222, 223 each terminating in separate openings with respective flanges 224, 225.

The dual tank 210 may be divided into two compartments 226 and 228 in any suitable manner. In the illustrated embodiment, a vertical flat wall member 230 is shown which extends from the top opening 218 and has its lower end secured at the top of the inverted conical sections 222, 223.

At the upper end of the tank are two product receiving conduits 234 and 236 for entry of the product into the compartments 226 and 228, respectively. At the inner ends of each of conduits 234 and 236 are valve closure members or doors 238 of similar construction. The bottom of the lower wall of conduits 234, 236 extends to a position approximately under the vertical walls of cylinder 216 and is sloped to reduce the force of the product acting against the inside surface of door 238.

Referring further to the enlarged views in FIGS. 4 and 5, each door member 238 includes a flat rear support surface 240. This surface 240 is secured to a layer or sheet 252 of plastic or rubber which is hinged at its upper side to the open end 237 of receiving conduits 236 and normally hangs downwardly in a valve open vertical position as shown in tank 211 of FIG. 1 and is pivotable about a substantially horizontal axis to its closed position as shown in tank 212.

Referring again to FIGS. 4 and 5, the valve closure member 238 has a hood 242, which is bulged and may have a semicylindrical shape with opposite edges secured to the back of the flat surface 240 with closure plates 244 at each end to form a chamber. The hood 242 is provided with an elongated opening 246 for receiving the end of a pipe 248 (see also FIGS. 1 and 3) which extends from the exterior of the tank for a purpose that will be described subsequently. The width of the opening 246 is only slightly larger than the outer diameter of pipe 248 and the length of opening 246 is such as to permit the doors 238 to move freely between the closed position shown in FIG. 1 in the right hand product receiving compartment 226 and the open or free-hanging vertical position shown in the left hand product receiving compartment 228 with surface 240 against the end of pipe 248.

The hinge for the closure member 238 may be of any suitable type. I prefer to use a flat, flexible sheet 252 of a rubber or plastic material such as polytetrafluoroethylene that can be easily secured to the flat surface 240 of the door 238. The upper end of sheet 252 may be easily clamped between two metal strips and a low friction hinge is thereby provided which has a long life and requires no lubrication. The flexible property of the sheet member 252 permits the door 238 to move between the open position shown in chamber 228 and the closed position shown in chamber 226 as a result of a flow of air under pressure through corresponding pipe 248. Also the sheet members 252 function as a sealing gasket and produce very little noise as the valve closure members 238 are moved to their closed position. Thus, the doors 238 are independently actuable since they are not physically interconnected for common movement. It follows, then, that the opening movement of either door may lag the closing movement of the other door.

The bottom of the dual tank 210 is provided with a suitably shaped closure member to close the two tank compartments 226, 228 except for an opening 256 for each tank communicating with a Y-shaped housing 257 which is flanged at its two upper ends for attachment to mating flanges surrounding openings 256 of the dual tank 210. Y-shaped housing 256 has two inlet product channels 258, 259, one for each of the tank compartments 226 and 228. The conduits 258, 259 are identical and each have end openings 260 lying in a plane at an angle of between about 25° and 35° from a vertical plane or preferably about 30° as illustrated. Each opening 260 is provided with a check valve in the form of a flat closure element 262. The closure elements 262 may be constructed in a manner described in connection with closure elements 238 and include flexible sheet members 264 hingedly secured at 266 and rigid support plates 268 of steel secured to the flexible sheet members 264.

Springs 270 resiliently urge the closure elements 262 toward a closed position. Springs 270 may not be needed with low density material, and the amount of spring force required for optimum operation will depend on a number of factors including the angle of the end opening 260, the size and weight of the steel plates 268 as well as the density of the product and the pneumatic characteristics of the pipeline which influence the negative pressure in the transition section 284 at the end of the product chute 276.

A closed chamber is provided by walls 272 and surrounds the ends of the product conduits 258, 259. This chamber, during operation, has less than atmospheric pressure because it is in communication with a discharge elbow at the lower end of the product chute 276 that extends into the pipeline at a region where high velocity gas or air exists as described above. The elbow extends through a high pressure chamber 278, also shown in FIG. 2. At the end of the feed chute elbow is an annular projection 280, cooperating with an inner annular projection 282 on the inner surface of the transition chamber 284 to form an annular sheath of high velocity air flow which creates a negative pressure that extends into the sealed chamber in which the check valve type closure members 262 are located as described above. The novel product feeding arrangement of the present invention is connected to the upper flanged end 277 of the elbow with a suitable flange 279 on the lower end of the Y-shaped housing 257.

The dual tank 210 includes access openings with removable sealing closures 286 for the compartments 226 and 228. In addition, each compartment may be provided with sealed inspection windows, only one of which for the compartment 228 is shown at 284 in FIG. 1.

A conventional turbine type air compressor 290, shown in FIGS. 1 and 2, may be used to supply compressed air or other suitable gas through the conduit means including members 292 and 294 to pressure chamber 278. A smaller pipe 296, extending into the material output conduit may be used if desired to produce a high velocity stream in the central part of the lower elbow portion of the chute 276. Valve 297 is provided to regulate the flow through pipe 296.

As best seen in FIG. 2, the compressor 290 also supplies compressed air through a pressure reducing valve 300, conduit 302, tee coupling 303, and valves 304 to the pipes 248 which extend into the chambers 226 and 228. The valves 304, one each in the path of low pressure air flow between the conduit 302 and each of the pipes 248, are controlled so that only one of the pipes 248 is supplied with compressed air at one time. The valves 304 may conveniently be electrically operated by signals from a control box 306 to which they are connected through conductors 308 and 310.

The lower portions of the chambers 226 and 228 are shown with suitable product presence sensors, such as switches 312 of a type commercially available and responsive to the presence of product in the respective compartments 226, 228. These sensors may be of any known construction that will open or close a control circuit as the product level falls below a selected height. The sensors 312 are connected through conductors 314 and 316 to the control box 306.

Air relief valves 318 are sometimes provided in the upper portions of each of the compartments when needed. These valves 318 may be also electrically operated and connected through conductors 320 and 322 to the control box 306.

The operation of the apparatus as described in connected with FIGS. 1–5 is as follows. Before the air compressor 290 is turned on, the valve doors 264 in the Y-shaped housing 257 are both in a closed position, even when both tanks are filled with product. The doors 238 at the upper ends of both tanks are open and assuming, as is customary, a supply of product is present, both tanks 211 and 212 will be filled.

By using 90° elbows for product channels 258, 259 in the Y-shaped housing 257, the outlet opening 260 is displaced laterally of the opening 256 at the lower end of its tank. This helps reduce the force tending to open the lower check valve doors 262 due to the weight of the product.

Where the product has good flow properties such as the case with a phosphate fertilizer, it has been found desirable to hang the door 262 not in a vertical position as shown in some of the other embodiments, but at an angle so that the door closed position makes an angle of about 30° with the vertical as illustrated. The weight of the steel plate 268 portion of the door provides an additional closing force. An added closing force, as needed, may be provided by spring 270. One desirable, though not an essential feature for many products, is that both doors 262 should remain closed prior to start up to avoid filling the lower chute section 276 and transition chamber 284 with product.

By having valve 300 closed at start up, the compressor can be started and brought up to a stable operating condition which might, for example, mean a compressor pressure of 20 to 25 psig. Then opening valve 300 to provide a relatively lower pressure of perhaps 5 psig to tee 303 (FIG. 3) and valves 304 to one of the tanks 211, 212 to close its respective product inlet door 238, places this lower pressure on the upper surface of the product and thus provides an added force for opening the door 262 in the Y-shaped housing 257. The product continues to feed into the transition chamber 284 and the lower end of the open door 262 is at a position which may abut, or at least interfere with the opening of the other door 262. When the product falls below product sensing switch 312, the circuit is changed so that the voltage from control unit 306 closes the open valve 304 and opens the closed valve 304. Valve 318, if used, provides a small vent opening to the atmosphere so that as product enters a tank 211, 212 the displaced air can escape without building up a pressure in the tank. This valve is not required if the product entering the dual tank 210 is not tightly packed and from a chamber open to atmospheric pressure.

When the signal from control unit 306 is received by the valves 304, the valve 304 that is opened supplies a blast of air against the abutting rear surface 240 of the open door (see tank 211 of FIG. 1) which is effective to force the door closed and cut off the incoming feed of product. The slot 246 in the semicylindrical wall 242 accommodates the end of pipe 248 as the door 238 closes. The gas inside the chamber enclosed by semicylindrical wall 242 leaks through slot 246, but at a rate insufficient to reduce the force on surface 240 enough to allow the door 238 to open.

The pressure of the air on the upper surface of the product quickly builds up to the level where product discharge through the lower door 262 starts. It has been surprising to observe that when the air flow through pipe 248 at the top of one of the tanks 211, 212 is turned off and product starts to enter the tank, the corresponding lower door 262 in the Y-shaped housing will close sufficiently soon that the other lower door 262 can open. By reason of the close proximity of the two doors 262, the open door moves up to a position which either maintains the other door completely, or very nearly, closed notwithstanding the negative pressure in the lower product chute region 276 and the weight of product acting against the closed door 262.

For "fine tuning" of the operation of this apparatus, valve 297 can be adjusted to regulate the flow rate of air through pipe 296 which also influences the negative pressure in chamber 276 and enhances the feed of product into the pipeline. Adjustment of the annular slot between surfaces 280 and 282 during operation of the apparatus as by use of the construction shown in FIG. 16 of my application Ser. No. 654,479 filed Feb. 3, 1976 now U.S. Pat. No. 4,009,912 (the entire disclosure of which is incorporated herein by reference), is advantageous.

In the event of a blockage in the pipeline, a positive pressure build-up occurs in the transition chamber 284 and feeds back to close the open door 262 and maintain both doors 262 closed until the pipeline flow rate is again established.

As the product drops below product level sensing switch 312, the product feed channel elbow 258, 259 is no longer completely filled and the gas under positive pressure in the tank 211, 212 passes into the negative pressure region of the transition chamber 284 thereby reducing somewhat the product feed rate and providing a time to allow the main pipeline to clear just before the switching action to the other tank happens.

Instead of using product sensing switches 312, I have found that equivalent performance can be achieved with less cost and reduced maintenance by employing a timer in the control unit 306. I have determined that the maximum rate of handling product is achieved by effecting a switching of tanks at the end of comparatively short intervals of time, such for example as less than about two minutes and preferably in the range of from about one minute to one second. Thus, it is desirable to construct each of the tanks 211, 212 to have a size no larger than that which can be emptied in less than about two minutes. In one preferred installation, I found that arranging the switching to occur after approximately 5 seconds, the rate of material in terms of tons per hour seemed to be optimized.

I have achieved ten percent greater rate of material flow as compared with a prior art product feed device employing a screw as a means for preventing blowback when both product feed devices were operated in the same pneumatic conveying system, i.e., the same compressor and same pipeline delivering the same product into the same silo. One major advantage of my apparatus, as compared to the prior art apparatus that had been in use in this installation for several years, is that the power required to drive the screw was not needed. In this particular system, the motor to drive the screw was rated at 150 H.P. In this same system, the air compressor motor was rated at 200 H.P. Therefore, the power saving alone was on the order of 40%, the rate of feed was increased by about 10%, and in my new system the problems of maintenance are limited to those associated with the four check valves and the control system, whereas the screw machine in the prior apparatus required considerable servicing, particularly where abrasive materials such as cement or ground phosphate rock are handled.

Another preferred embodiment of the pneumatic coveying system and method is shown with reference to FIGS. 6–9. This embodiment is similar in many respects to the embodiment illustraded in FIGS. 1–5. Portions of the two embodiments that are identical, bear like numerals throughout the drawings.

Figure 6:
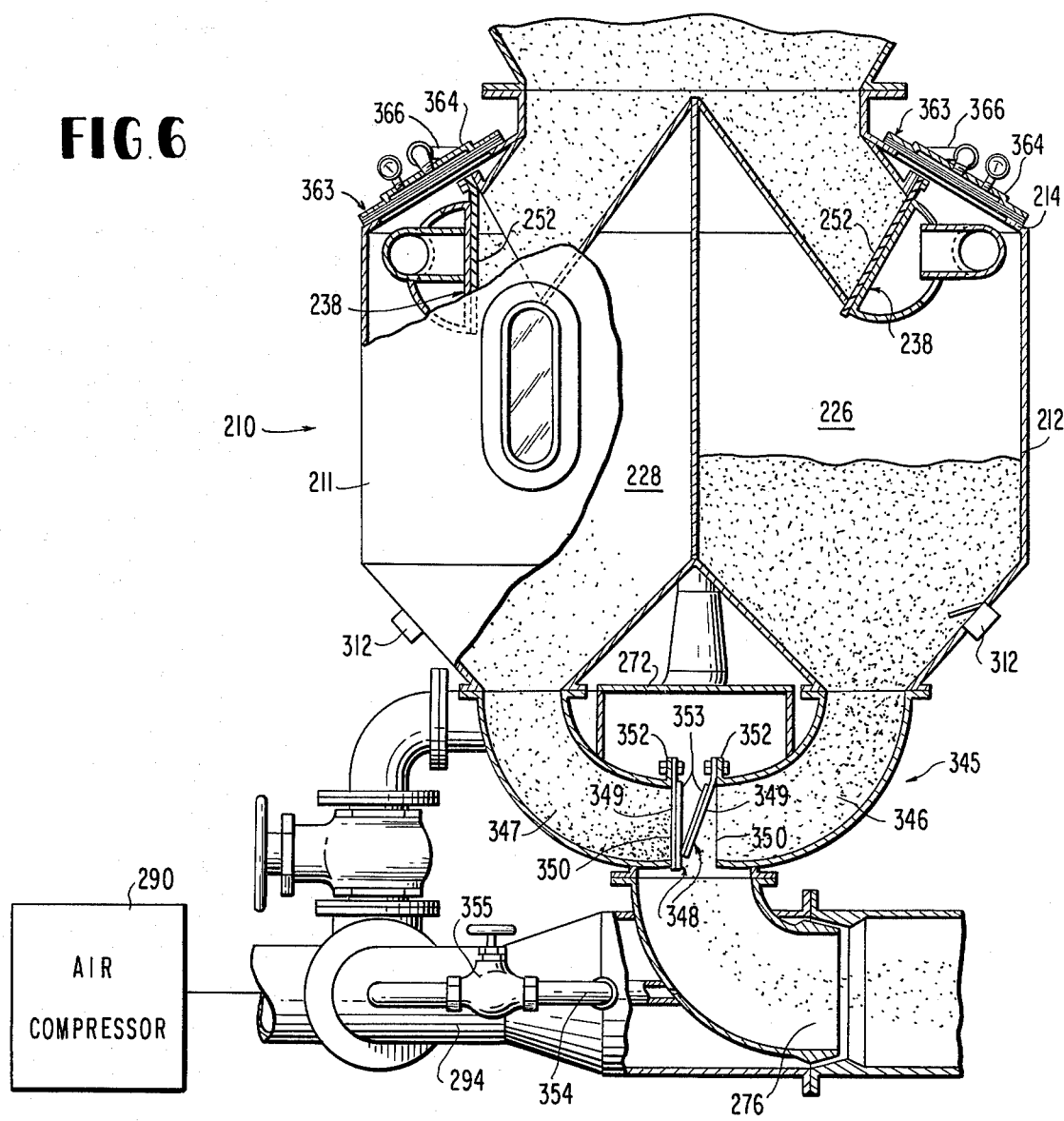
FIG. 6 is a front elevation in partial section of a more preferred embodiment of my invention.

With reference to FIG. 6, a Y-shaped housing 345 includes two identical inlet product channels 346,347, one for each of the tank compartments 226 and 228. The product channels 346, 347 terminate in end openings 350 which lie in vertical planes. Each end opening 350 is provided with a check valve in the form of a flat closure element 348. The flat closure elements 348 may be constructed in a manner described in connection with closure elements 262. They include flexible sheet members 349, mounted as indicated at 352, and rigid metal plates 353 secured to the flexible sheet members 349 so that when one of the flat closure elements 348 is in the open position, the other flat closure element is prevented from opening.

In this embodiment, the auxiliary air supply to the lower end of the product chute means does not include an element protruding into the interior of the material channel. Instead, the pipe 354, which provides a means of communication between the conduit member 294 and the lower product chute elbow 276, extends only to the surface of the product chute elbow and communicates with a small hole therein. A shut-off valve 355 connected to the pipe 354 may be opened to supply a high velocity stream of pressurized gas to the interior of the elbow 276 to dissipate an accumulation of product therein, if such should occur, for example, as a consequence of a shut down of the system.

The systems for supplying air to and venting air from the upper ends of the tanks 211, 212 also have been provided with a number of features that can contribute to the performance of the apparatus in some instances.

One such feature is the provision of manually controlled shut-off valves 356,357 on either side of the air supply coupling 303 so that the system may be operated at reduced rate during repair of one portion of the system. For example, if one of the tanks 211, 212 must be repaired, the manually controlled valve regulating supply of air to that tank may be closed, and the system may operate at approximately one-half capacity, using only one of the tanks. The provision of manually controlled valves 356,357 also permits the repair of one of the electrically controlled valves 304, without requiring the pneumatic conveying system to be entirely shut down.

Another advantageous feature of the air supply systems of this embodiment is that the solenoid valves 304 are protected against dust. In the embodiment of FIG. 2, the particulate matter suspended in the gas within a tank 211,212 sometimes travels back into the conduits 248 and, over a period of time, this particulate matter may damage or interfere with the operation of the electrically controlled valves 304. With the construction shown in FIG. 7, such difficulties are obviated, because the particulate matter within the tanks is prevented from flowing back into the solenoid valves 304 by check valves 358,359 provided in conduits 248.

Figure 9:
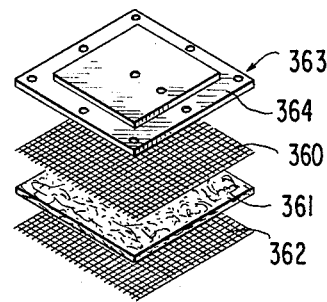
FIG. 9 is an exploded view of a filter of the apparatus of FIG. 6.

The flow of dust through the venting system for the tanks also is prevented. As shown in FIGS. 6 and 9, each tank is provided with an air filter 363 in order to block escape of the particulate matter suspended in the gas of a tank compartment 226,228. Each air filter 363 may comprise a sandwich of materials. Two layers of very fine mesh wire screen 360,362 may be separated by a layer of very closely packed fiberglass 361. The particular characteristics of the materials used in the filter sandwich depend upon the size of the particulate matter associated with a product. Each sandwich of filter materials may be secured over one of two openings in the upper portion 214 of the dual tank 210 by a filter cover plate 364.

These filters are kept free of accumulations of dust particles by back flushing air through them for a period of time during each cycle of operation of the equipment. Conduits 366 provide communication between the filters 363 and the air supply conduits 248 below the check valves 358,359, so that when pressurized air is being forced into the top of one of the tanks 211,212, some air will also flow through the filter in a reverse direction and on into that tank. This back flow serves to flush any particulate matter on the filter back into the tank.

Figure 8:
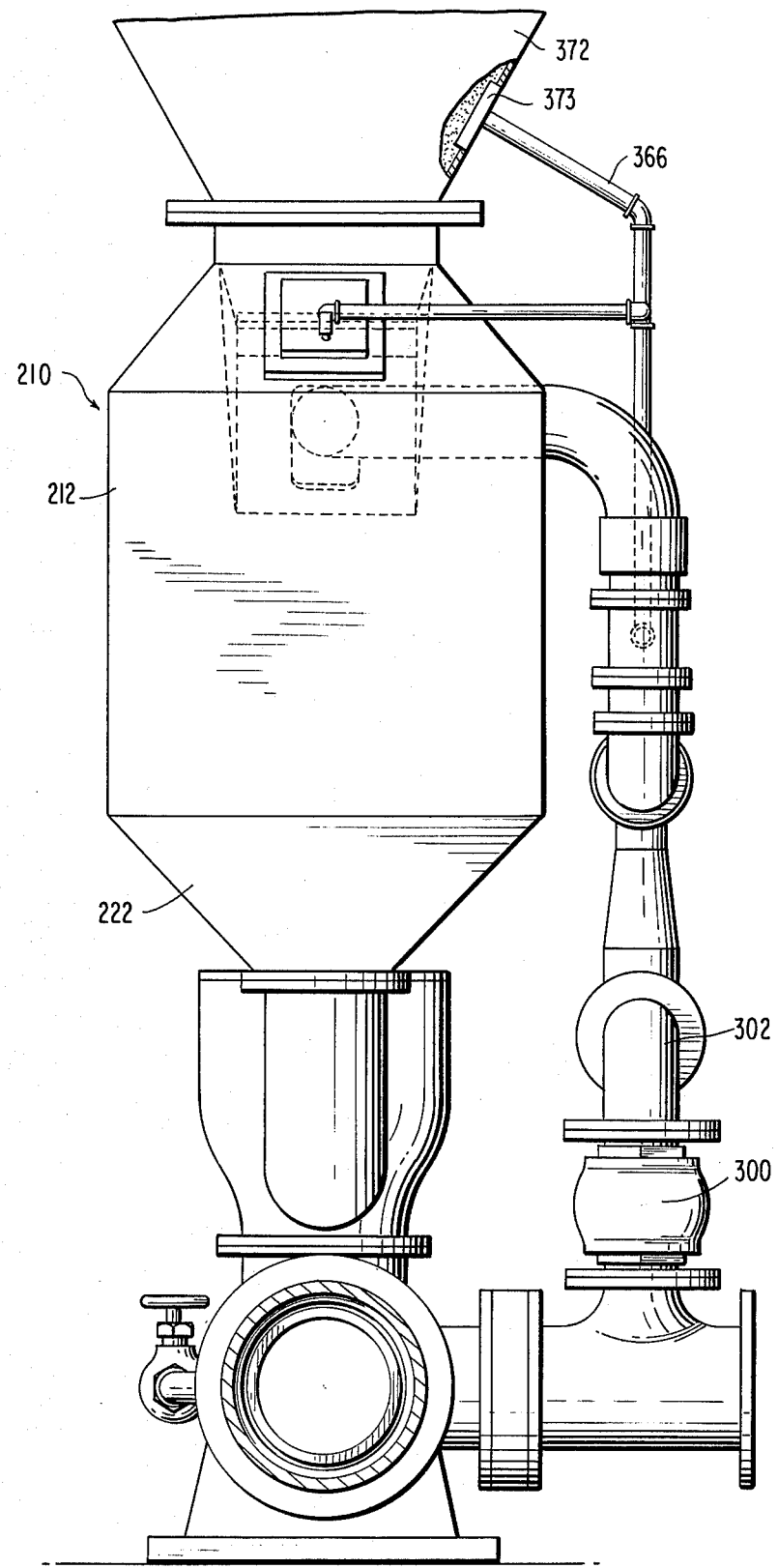
FIG. 8 is a right side elevation of the apparatus of FIG. 6.

The tank venting system is shown in FIGS. 7 and 8 as including conduits 370 which provide a means of communication between the air outlet conduits 366 and a pair of conventional air pads 373 located in upper product supply region or hopper 372 of the apparatus. The air pads 373 direct the filtered gas vented from the tanks 211,212 back into the product supply (rather than into the atmosphere) so as to utilize the force of the air to agitate the product material. Of course, in some installations, the air pads 373 will not be needed and, if desired, the air vented from the tanks may be released directly to the atmosphere.

Control over the venting operations is exercised by electrically operated solenoid valves 374 in conduits 370 leading from the filtered discharge openings in the tanks. These valves 374 may be connected through conductors 376 to the control box 306. In a preferred cycle, the solenoid valve 304 controlling the flow of air to a tank 211,212 is operated out of phase, but concurrently with, the solenoid valve 374 for controlling the venting of that tank. For example, when the inlet valve 304 for tank 211 is open, the outlet valve 374 for that tank will be closed, and vice versa.

A pair of pressure gauges 378 may be provided for the tanks 211,212 so that the pressure within each tank may be determined. These pressures within the tank chambers 226,228 are indicative of the condition of operation of the system.

The operation of the apparatus as described in connection with FIGS. 6–9 is similar to the operation of the embodiment of FIGS. 1–5, as described above. By having valve 300 closed to start up, the compressor can be started and brought up to a stable operating condition which might, for example, mean a compressor pressure of 20 to 25 psig. After a suitable pressure has been reached, the tee 303 may be provided with a relatively lower pressure of perhaps 10 to 15 psig by opening valve 300. Prior to opening valve 300, one of the air venting valves 374 and the valve 304 that is associated with the other tank 211, 212 will have been closed so that pressurized air may flow only into the tank that is not vented. The flow of pressurized gas into a tank closes the respective product inlet door 238 and places this pressure on the upper surface of the product. The pressure differential between the interior of the tank and the housing 272 of that tank to its open position and the product is discharged from the tank. When the product falls below product sensing switch 312 or when a predetermined time interval has elapsed, the circuit is changed by the control unit 306 to close the open valve 304 and open the closed valve 304. At the same time, the control unit 306 closes the open air venting valve 374 and opens the closed air venting valve 374 to enable the tank that is being filled with product to be vented to atmospheric pressure. In order to control the rate of venting, variable restrictors 368 may be provided in the conduits 366. This permits the establishment of a controlled delay interval between the shifting of the solenoid valves and the actual opening of the product inlet doors 252.

In the event of a blockage of product flow in the pipeline, the back pressure quickly builds up to a level greater than the pressure in the tanks 211, 212. The pressure build-up both closes the valve members 348 of lower product chute openings 350 and maintains both doors 348 closed until the pipeline flow is again established.

An additional embodiment of the pneumatic conveying system and method is shown with reference to FIGS. 10 and 11. This embodiment is similar in many respects to the embodiments illustrated in FIGS. 1–5 and 6–9. Portions of the embodiments which are identical, bear like numerals throughout the drawings.

The embodiment of FIGS. 10 and 11 is intended primarily to deal with situations in which granular material cannot be conveniently supplied to the tanks by gravity, such as for example, when product is to be unloaded from a mobile container situated at a level below the tanks 211, 212.

In such a case, a product supply duct is provided which forms a common supply for both tanks. The supply duct includes a manifold 400 situated above the tanks 211, 212 and a conduit 402 connected to the manifold. The conduit 402 is to be placed in communication with the container to be emptied (not shown). In order to transfer granular product to the tanks 211, 212 a transfer system is provided which alternatively produces a vacuum within the tanks 211, 212. A suction force will thus be created for drawing the product from the source and into the tank.

As best seen in FIG. 11, one preferred transfer system is somewhat similar to the venting system discussed in relation to FIGS. 6–9 in that a pair of conduits 366, having solenoid valves 374, are connected to the tanks 211, 212. Each of the conduits 366 has connected thereto a conduit 404 which communicates with a common suction pump or compressor 406. This suction pump 406 can be of any conventional type and is set to operate continuously during the transfer operation. If desired, the conduits 404 can be connected to the intake of the existing compressor 290, rather than employing a separate pump 406.

The solenoid valves 374, which in this embodiment constitute suction control valves, are mounted in the conduits 404 to alternately communicate the conduits 366 with the suction pump 406. Each valve 374 is connected to the control unit 306 so as to be automatically opened when the air pipe 248 of its associated tank is closed, i.e., when the tank is to be filled. For example, the tank 211 will communicate with the suction pump 406 while its door 238 is open, causing pressure to be reduced below atmospheric within the tank. This causes granularized product to be drawn through the conduit 402 and the open door 238 and into the tank 211. The air filter 363 resists the passage of product through the conduit 366 to the suction pump. Additional filters can be supplied in the suction system as needed.

Since the conduit 366 communicates with the pipe 248, a suction will be established in the latter to aid in opening the door 238.

As the tank 211 is being filled in this manner, the other tank 212, whose associated valve 374 is closed, is being emptied. The door 238 to the tank 212 is maintained closed by gas from the conduit 214 and, simultaneously, gas is discharged from the conduit 214, and through conduit 366 to clean the filter 363.

In operation, filling of the tank 211 takes place when, through operation of the control unit 306, the valve 304 associated with tank 211 is closed and the valve 304 associated with the other tank 212 is opened. Simultaneously, the valve 374 associated with the tank 211 is opened and the other valve 374 is closed, to communicate the tank 211 with the suction pump 406. As a result, pressure in the tank 211 is reduced below atmospheric. The resulting suction action through the supply duct draws product from the source and into the tank 211. Simultaneously, the other tank 212 is being emptied in the manner previously discussed. Subsequently, the procedure is reversed to cause the tank 212 to be filled and the tank 211 to be emptied. Such filling and emptying operations are designed to be completed within two minutes, preferably in the range of from about 1 minute to 1 second.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. Apparatus for feeding product into a pneumatic conveying system including a pipeline comprising:
   a pair of storage tanks each having an opening at their upper portions for receiving product from a common supply;
   each of said openings having doors;

means for alternately opening and closing said doors so that while one door is opened the other door is closed;

each of said tanks having an opening in its lower end;

a housing having two inlet openings and a single outlet opening communicating with the pipeline, means mounting said housing to the lower end of said tanks with the inlet openings of the housing in alignment with the respective openings in the lower tank ends;

said housing having first and second product channels extending from the two inlet openings to the outlet opening;

each of said product channels containing a check valve member opening into a common chamber including the outlet opening;

each of said check valve members comprising a plate-like member mounted for swinging movement about a substantially horizontal axis, said axes being substantially parallel and spaced and arranged so that the lower free end of each valve member opens to a normal position near the outer surface of the other valve member when closed;

means for introducing a pressure greater than atmospheric into the tank having its door closed, the other tank being exposed to essentially atmospheric pressure when its door is open; and means connected to the housing outlet opening for feeding product into the pipeline at a region having a normal operating pressure less than the pressure introduced into the tank having its door closed.

2. Apparatus as claimed in claim 1 wherein each valve member has a first surface area exposed to the pressure in said pipeline region, and a second surface area exposed to the pressure in the tank having its door closed, said first and second surface areas being sufficient to provide an operating force that is effective to cause one valve member to be opened by a pressure in said tank having its door closed that is greater than the pressure in said pipeline region to allow product feed and to cause both valve members to be closed by a pressure in said pipeline region that is greater than the pressure in either storage tank.

3. Apparatus as claimed in claim 1, wherein:

the openings at the upper tank ends each include product receiving conduits having a lower end positioned inside said tank with the doors located at the lower end of said conduits and hinged to open into the interior of said tanks;

each of said doors having on the surface opposite said conduit a hood forming a chamber having an opening;

means including a separate valve associated with each tank for supplying gas flow through the opening in said hood to produce a pressure in said chamber sufficient to hold said door closed against the weight of product in the product receiving conduit while the check valve member in the product channel at the bottom of the same tank is open to discharge the product into the pipeline; and means for sequentially opening and closing each of said gas flow valves to control the sequential refilling of said tanks.

4. Apparatus as defined in claim 3 wherein the hood has a generally semi-cylindrical shape, the hood opening is in the form of an elongated slot, and the gas flow into the chamber enclosed by said hood produces a force sufficient to maintain said door in a closed position while simultaneously allowing gas flow to escape through part of said slot to place a higher than atmospheric pressure on the upper surface of the product in the tank while the product is being emptied into said pipeline.

5. Apparatus for feeding product into a pneumatic conveying system including a pipeline comprising:

a source of gas under pressure substantially greater than atmospheric;

first gas conveying means communicating said source of gas with said pipeline to establish a product-conveying gas flow therein;

first and second storage tanks each having an opening at its upper portion for receiving product from a common supply;

first and second doors for opening and closing said openings, each door normally disposed in an open position;

each of said tanks having an opening in its lower end;

housing means having two inlet openings and a single outlet opening communicating with said pipeline, means mounting said housing means to the lower end of said tanks with the inlet openings of the housing means in alignment with the respective openings in the lower tank ends;

said housing means having first and second product channels extending from the two inlet openings to the outlet opening;

each of said product channels containing a check valve member opening into a common chamber including the outlet opening;

each of said check valve members comprising a plate-like member mounted for swinging movement about a substantially horizontal axis; and a gas system connected to said upper portions of said tanks and including:

first passage means and vent means communicating with said first tank for alternately supplying pressurized gas to and venting gas from said upper portion of said first tank, second passage means and vent means communicating with said second tank for alternately supplying pressurized gas to and venting gas from said upper portion of said second tank, control means for causing said first passage means to supply pressurized gas to said first tank to close said first door and force product from said first tank and into the gas flow in said pipeline at a regin having a normal operating pressure less than the pressure introduced into said first tank, while causing said second vent means to vent gas from said second tank to allow said second door to assume its normal open position for admitting product from said supply, and then causing said second passage means to supply pressurized gas to said second tank to close said second door and force product from said second tank and into the gas flow in said pipeline at a region having a normal operating pressure less than the pressure introduced into said second tank, while causing said first vent means to vent gas from said first tank to allow said first door to assume its normally open position for admitting product from said supply;

said first and second doors being closed by the pressurized gas from said first and second passage means and being arranged for independent opening and closing movements, so that the opening of said second door may lag the closing of said first door and so that the opening of said first door may lag the closing of said second door.

6. Apparatus as claimed in claim 5 wherein:
the openings at the upper tank ends each include product receiving conduits having a lower end positioned inside said tank with the doors located at the lower end of said conduits and hinged to open into the interior of said tanks;
each of said doors having on the surface opposite said conduit a hood forming a chamber having an opening;
means including a separate valve associated with each tank for supplying gas flow from the associated passage means through the opening in said hood to produce a pressure in said chamber sufficient to hold said door closed against the weight of product in the product receiving conduit while the check valve member in the product channel at the bottom of the same tank is open to discharge the product into the pipeline; and
means for sequentially opening and closing each of said gas flow valves to control the sequential refilling of said tanks.

7. Apparatus as defined in claim 6 wherein the hood has a generally semi-cylindrical shape, the hood opening is in the form of an elongated slot, and the gas flow into the chamber enclosed by said hood produces a force sufficient to maintain said door in a closed position while simultaneously allowing gas flow to escape through part of said slot to place a slightly higher than atmospheric pressure on the upper surface of the product in the tank while the product is being emptied into said pipeline.

8. Apparatus according to claim 5, wherein said passage means are directed toward a rear side of each door.

9. Apparatus as claimed in claim 5 wherein said control means includes switching means connected to alternately control the introduction of gas pressure into said tanks, and timing means connected to operate said switching means for switching the gas pressure from one tank to the other at intervals in the range of from about one minute to one second.

10. Apparatus according to claim 5, wherein said first and second vent means each includes a vent line connected adjacent the top of each tank and communicating with the interior of the tank, a filter disposed between the tank interior and said vent line to filter product from air, said vent line being fluidly connected to said passage means, and said control means includes valve means for alternately connecting said vent line with atmospheric pressure during venting of the tank and with a source of pressure greater than atmospheric to blow air through said filter and into said tank to clean said filter.

11. Apparatus according to claim 5, wherein said first and second vent means each comprises a pair of suction conduits, each communicating at one end with the interior of a respective one of said tanks, suction means connected to the other ends of said suction conduits for establishing a vacuum therein; and said control means including valve means for alternately opening and closing said suction conduits so that the opened suction conduit draws product through said common supply and into its associated tank while the other tank is being emptied.

12. Apparatus according claim 11, including a filter disposed between said tank and its associated suction conduit, and said control means including valve means for connecting said suction line to a source of pressure greater than atmospheric to blow air through said filter and into said tank to clean said filter.

13. Apparatus for feeding product into a pneumatic conveying system including a pipeline comprising:
a source of gas under pressure substantially greater than atmospheric;
first gas conveying means communicating said source of gas with said pipeline to establish a product-conveying gas flow therein;
a pair of storage tanks each having an opening at their upper portions for receiving product from a common supply;
each of said openings having independently actuable doors;
means for alternately opening and closing said doors independently of one another so that while one door is opened the other door is closed;
each of said tanks having an opening in its lower end;
housing means having two inlet openings and a single outlet opening communicating with said pipeline, means mounting said housing means to the lower end of said tanks with the inlet openings of the housing means in alignment with the respective openings in the lower tank ends;
said housing means having first and second product channels extending from the two inlet openings to the outlet opening;
each of said product channels containing a check valve member opening into a common chamber including the outlet opening;
each of said check valve members comprising a plate-like member mounted for swinging movement about a substantially horizontal axis;
second gas conducting means for introducing a pressure greater than atmospheric into an upper portion of the tank having its door closed to force product from said last-named tank, through said outlet opening of said housing means and into the gas flow in said pipeline at a region having a normal operating pressure less than the pressure introduced into the tank having its door closed;
a vent line connected adjacent the top of each tank and communicating with the interior of the tank;
a filter disposed between the tank interior and said vent line to filter product from air;
said vent being fluidly connected to said conducting means; and
valve means for alternately connecting said vent line with atmospheric pressure during venting of the tank and with a source of pressure greater than atmospheric to blow air through said filter and into said tank to clean said filter.

14. Apparatus according to claim 13 wherein said vent line includes a connection with said passage means through which said pressure greater than atmospheric is supplied.

* * * * *